United States Patent [19]
Jan Verstegen et al.

[11] 3,813,569
[45] May 28, 1974

[54] LUMINESCENT SCREEN AND MERCURY VAPOR DISCHARGE LAMP CONTAINING SAME

[75] Inventors: Judicus Marinus Pieter Jan Verstegen; Emiel Petrus Juliaan De Meester, both of Emmasingel, Eindhoven, Netherlands

[73] Assignee: U.S. Philips Corporation, New York, N.Y.

[22] Filed: Dec. 8, 1972

[21] Appl. No.: 313,599

[30] Foreign Application Priority Data
Dec. 18, 1971 Netherlands .................. 7117430

[52] U.S. Cl.... 313/108 R, 117/33.5 L, 252/301.4 F
[51] Int. Cl.............................................. C09k 1/54
[58] Field of Search........... 252/307.4 F; 117/33 SL; 313/108 R, 109

[56] References Cited
UNITED STATES PATENTS

| | | | |
|---|---|---|---|
| 3,505,240 | 4/1970 | Barry | 252/301.4 F |
| 3,544,481 | 12/1970 | Barry | 252/301.4 F |
| 3,651,363 | 3/1972 | Barry | 252/301.4 F |
| 3,676,361 | 7/1972 | Datta | 252/301.4 F |
| 3,718,600 | 2/1973 | Tak et al. | 252/301.4 F |

*Primary Examiner*—Oscar R. Ventz
*Assistant Examiner*—J. Cooper
*Attorney, Agent, or Firm*—Frank R. Trifari

[57] ABSTRACT

A luminescent silicate activated by bivalent europium defined by the formula
$$Sr_{1-x-y-z-p}Ba_xCa_yMg_zEu_pB_2Si_2O_8$$
in which
$0 \le x \le 0.60$
$0 \le y \le 0.50$
$0 \le z \le 0.25$
$0.01 \le p \le 0.20$
$x + y + z + p \le 0.70.$ Upon excitation by short-wave or long-wave ultraviolet radiation the silicate exhibits a narrow band emission having a maximum at 440 nm. The silicate is preferably used in mercury vapour discharge lamps intended for photocehmical purposes.

7 Claims, 1 Drawing Figure

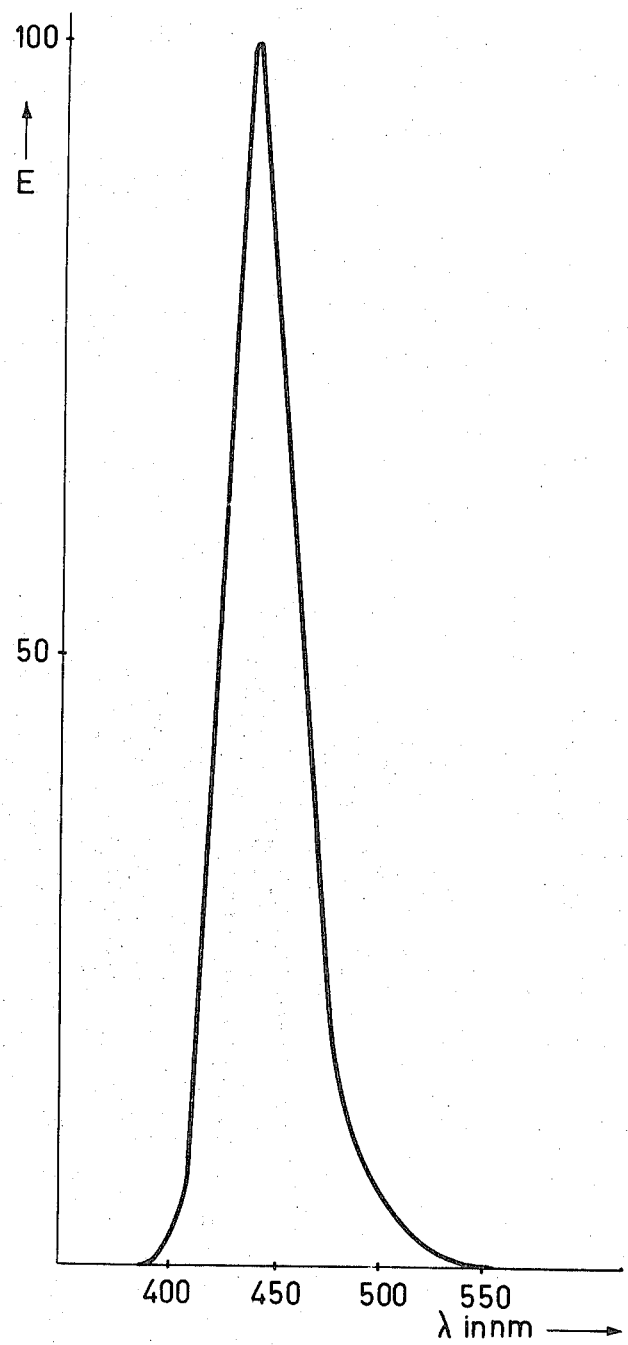

LUMINESCENT SCREEN AND MERCURY VAPOR DISCHARGE LAMP CONTAINING SAME

The invention relates to a luminescent screen provided with a luminescence silicate activated by bivalent europium. Furthermore the invention relates to mercury vapour discharge lamps provided with a luminescent screen of this kind and to the luminescent silicate itself.

Silicates activated by bivalent europium are known from the published German Patent Application 2,028,376, in which the fundamental lattice may be defined by the formula $MeAl_2Si_2O_8$ in which Me represents one or more of the alkaline earth metals calcium, strontium and barium. These alkaline earth aluminium silicates are known under the name of alkaline earth feld spars and may have different crystal structures. Upon activation of these feldspars by bivalent europium luminescent materials are obtained which upon excitation by ultraviolet radiation or by electrons have an emission whose spectral distribution consists of a comparatively broad band. Dependent on the nature of the alkaline earth metal used and on the crystal structure of the silicate the maximum of this emission band is located at wavelengths of between 370 and 440 nm. The luminescent properties of these feldspars activated by bivalent europium are also described in recent publications in J. Electrochem. soc. Vol. 118, No. 6, page 918–923 and page 1,009–1,011. These Articles also state particulars on the crystal structure of the relevant fundamental lattices.

A mineral occurring in nature known under the name of danburite is akin to the group of feldspars. Danburite is a calcium borate silicate defined by the formula $CaB_2Si_2O_8$ and has an orthorhombic crystal symmetry.

The object of the invention is to provide luminescent materials which have an efficient emission and a spectral distribution consisting of a narrow band having a maximum located at approximately 440 nm. For some time the subject of many investigations has been to obtain luminescent materials of this kind because these materials are important for use in discharge lamps for photochemical processes. A photochemical reaction may be initiated or accelerated by radiation in which in many cases only radiation having very defined wavelengths dependent on the nature of the photochemical reaction is active. A discharge lamp in combination with a luminescent material whose emission maximum is located at the wavelengths which are optimum for the photochemical reaction is very suitable for these purposes. It is desired that the emission band of the luminescent material is as narrow as possible in order to concentrate as much as possible radiation energy in the spectral range active for the photochemical reaction.

A luminescent screen according to the invention is provided with a luminescent silicate activated by bivalent europium and is characterized in that the silicate is defined by the formula $Sr_{1-x-y-z-p}Ba_xCa_yMg_zEu_pB_2Si_2O_8$ in which $0 \leq x \leq 0.60$
$0 \leq y \leq 0.50$
$0 \leq z \leq 0.25$
$0.01 \leq p \leq 0.20$
$x + y + z + p \leq 0.70$ Experiments which have led to the invention have yielded a number of compounds hitherto unknown, namely strontium borate silicate defined by the formula $SrB_2Si_2O_8$ and the silicates defined by this formula in which strontium is partly replaced by one or more of the elements barium, calcium and magnesium. It has been found that these new compounds have a crystal lattice which shows correspondence to that of danburite. Upon activation of these fundamental lattices by bivalent europium luminescent materials are obtained which upon excitation by short-wave or long-wave ultraviolet radiation and also upon excitation by electrons exhibit an efficient emission having a narrow spectral distribution of the emitted radiation. The emission maximum is located at approximately 440 nm and the half-value width of the emission band is approximately 40 nm. The luminescent silicates according to the invention have a characteristic X-ray diffraction diagram. In table I below the measurements of $d$-values and the estimated intensities (I) upon X-ray diffraction analysis of $SrB_2Si_2O_8$ are shown.

Table I

| d-value | I | d-value | I |
|---------|-----|---------|-----|
| 3.62 | 100 | 2.48 | 25 |
| 3.50 | 85 | 2.43 | 20 |
| 3.30 | 70 | 2.20 | 25 |
| 3.01 | 25 | 2.06 | 25 |
| 2.96 | 25 | 2.01 | 25 |
| 2.78 | 70 | 1.99 | 30 |
| 2.71 | 40 | | |

In the luminescent silicates according to the invention strontium may be partly replaced by one or more of the elements barium, calcium and magnesium. The substitutions do not result in essential changes of the X-ray diffraction pattern as is shown in Table I if the barium content $x$ is chosen to be not more than 0.60, the calcium content $y$ is not more than 0.50 and the magnesium content $z$ is chosen to be not more than 0.25. The content of all elements together which replace strontium, that is to say, the value of $x + y + z + p$ (also the europium content $p$ is to be included in this case) is to be not more than 0.70. For values of $x$, $y$ and $z$ above the said maximum values materials are obtained which do not have the characteristic X-ray diffraction pattern of table I and which have a too low luminous flux for practical uses. The pure barium, calcium and magnesium borate silicates ($x = 1$, $y = 1$ and $z = 1$ in the above-mentioned general formula) could not be obtained.

Europium used as an activator likewise replaces part of strontium in the silicates according to the invention. The europium content $p$ may be chosen to be within wide limits. However, for values of $p$ of less than 0.01 or more than 0.20 materials having a too low luminous flux are obtained.

A luminescent silicate according to the invention may be satisfactorily excited both by short-wave and long-wave ultraviolet radiation. The silicate then emits in the blue part of the spectrum. The spectral distribution of the emitted radiation consists of a narrow band having a maximum at approximately 440 nm. The half-value width of this emission band is approximately 40 nm. The silicate according to the invention may also be excited by electrons while they have substantially the same emission as when excited by ultraviolet radiation.

The luminescent silicates according to the invention may be advantageously used in combination with discharge lamps intended for photochemical purposes. Particularly advantagous use may be found in phototherapy of hyperbilirubinemia in new-born babies (see Illuminating Engineering Society 1971, Conference Preprint No. 26).

It has been found that higher values of the luminous flux can be obtained with the luminescent strontium borate silicate according to the invention if a small part of strontium is replaced by barium. Therefore a luminescent silicate according to the invention is preferred for which $0.10 \leq x \leq 0.40$.

Replacement of slight quantities of strontium by magnesium has also a favourable influence on the luminous flux of the luminescent silicates according to the invention. Values of the magnesium content $z$ in the range of $0.05 \leq z \leq 0.15$ are therefore preferred.

The highest values of the luminous flux are obtained with luminescent silicates according to the invention for which the europium content $p$ is located between the limits 0.03 and 0.10. These values of $p$ are therefore preferably used.

Since the silicates according to the invention can be eminently excited by short-wave ultraviolet radiation emitted by a low-pressure mercury vapour discharge (predominantly 254 nm excitation) they are preferably used in low-pressure mercury vapour discharge lamps. The silicates may alternatively be used in high-pressure mercury vapour discharge lamps because they can likewise be satisfactorily excited by radiation having a wavelength of 365 nm. It is then an advantage that the temperature dependence of the luminous flux of the silicates according to the invention is favourable.

The invention will now be further described with reference to some examples, a table and a FIGURE.

The FIGURE shows the spectral energy distribution of a luminescent silicate according to the invention in a graph.

EXAMPLE I

A mixture is made of
2.418 g $SrCO_3$
2.137 g $H_3BO_3$
2.163 g $SiO_2$
0.158 g $Eu_2O_3$.

This mixture is heated in air for an hour in a furnace at a temperature of 600°C. After cooling the mixture is subsequently four times heated every time for one hour at 1,000°C in a weakly reducing atmosphere. This atmosphere is obtained by passing a nitrogen stream containing a few percent of hydrogen into the furnace. After each heat treatment the product is ground and sieved. The luminescent material obtained in this manner has an X-ray diffraction pattern as given in the above-mentioned table I and is defined by the formula $Sr_{0.95}Eu_{0.05}B_2Si_2O_8$. Upon excitation by short-wave ultraviolet radiation (predominantly 254 nm) this material is found to have an emission maximum at 440 nm and a half-value width of the emission band of 40 nm. The luminous flux then obtained is 43 percent relative to luminescent magnesium tungstate (NBS standard 1027). The said magnesium tungstate used as a standard has an emission at a maximum in the same part of the spectrum as the luminescent silicates according to the invention; the emission band of the standard is, however, much broader than that of the silicates according to the invention so that much energy is radiated at wavelengths which are less desirable for given uses.

If the quantities by weight of the starting materials in the above-mentioned example are derived to gram atoms it is found that quantities are used which do not exactly correspond to the stoichiometry. Notably in this example a small excess, (approximately 4 percent) of silicon dioxide is used. As is known this has a favourable influence in many cases on the reaction speed of the mixture. Generally small deviations from the stoichiometry may be admitted when preparing the luminescent silicates according to the invention. The excess of one or more of the composite components remains present in addition to the luminescent phase and is generally not disturbing. The heating temperature to be used during preparation may be chosen to be wide limits and likewise as the firing period and the number of firing treatments it is dependent on the reactivity of the firing mixture. As regards the firing atmosphere for preparing the luminescent silicates according to the invention it is to be noted that the starting mixture, after having been prefired preferably at a relatively low temperature (for example 600°C) in air, is generally heated several times for, for example, one hour at, for example, 900°– 1,000°C in a protective atmosphere. This atmosphere may be built up of nitrogen or nitrogen including a few percent of hydrogen. It is alternatively possible to obtain such an atmosphere by mixing the starting mixture with some percent of $NH_4Cl$ and by passing a nitrogen stream into the furnace during the heat treatment.

Analogously as described in the above-mentioned example a number of luminescent silicates are prepared with different values of the barium, calcium and magnesium contents. The composition of these silicates is given in table II below. Table II also gives the value of the luminous flux (LO) in percent (relative to the standard NBS 1027 already referred to) upon excitation by radiation having a wavelength of 254 nm. All these materials are found to have a spectral distribution with a maximum at approximately 440 nm and a half-value width of approximately 40 nm. X-ray diffraction analyses show that all these silicates have the characteristic diagram as given in table I.

Table II

| Example | Composition | | | | | LO in % |
|---|---|---|---|---|---|---|
| | Sr | Ba | Ca | Mg | Eu | |
| 1 | 0.95 | — | — | — | 0.05 | 43 |
| 2 | 0.875 | — | 0.075 | — | 0.05 | 48 |
| 3 | 0.725 | — | 0.225 | — | 0.05 | 52 |
| 4 | 0.475 | — | 0.475 | — | 0.05 | 47 |
| 5 | 0.875 | 0.075 | — | — | 0.05 | 55 |
| 6 | 0.725 | 0.225 | — | — | 0.05 | 64 |
| 7 | 0.475 | 0.475 | — | — | 0.05 | 52 |
| 8 | 0.875 | — | — | 0.075 | 0.05 | 60 |
| 9 | 0.725 | — | — | 0.225 | 0.05 | 49 |
| 10 | 0.650 | 0.10 | 0.10 | 0.10 | 0.05 | 48 |

EXAMPLE II

A mixture is made of
1.057 g SrO
1.088 g Ba(OH)$_2$·8H$_2$O
1.781 g H$_3$BO$_3$
1.803 g SiO$_2$
0.132 g Eu$_2$O$_3$.

This mixture is heated in air for one hour at 600°C. Subsequently the mixture is heated three times every time for one hour in a weakly reducing atmosphere at a temperature of 1,000°C. After each heat treatment the product is ground and sieved. The luminescent material obtained is defined by the formula Sr$_{0.725}$Ba$_{0.225}$Eu$_{0.05}$B$_2$Si$_2$O$_8$ and upon excitation by shortwave ultraviolet radiation it has a luminous flux which is 72 percent relative to NBS 1027. It is found that when using oxides or hydroxides of the alkaline earth metals in the starting mixture instead of carbonates, a higher luminous flux can be achieved with the luminescent material obtained (compare example 6 of table II).

EXAMPLE III

Analogously as described with reference to example II a luminescent silicate is prepared which is defined by the formula Sr$_{0.875}$Mg$_{0.075}$Eu$_{0.05}$B$_2$Si$_2$O$_8$. The silicate has a luminous flux which is 70 percent of that of NBS 1027.

In order to determine the influence of the europium content $p$ on the luminous flux of the silicates according to the invention a number of silicates is prepared having SrB$_2$Si$_2$O$_8$ as a fundamental lattice and with different values for $p$, namely 0.02, 0.05 and 0.10. The luminous flux obtained with these silicates was 38, 59 and 55 percent, respectively, relative to NBS 1027.

The FIGURE shows the spectral distribution of the emitted radiation of the luminescent silicate according to example 6 of Table II. The wavelength is plotted in nm on the horizontal axis and the emitted radiation energy E per constant wavelength interval is plotted in arbitray units on the vertical axis. The maximum of the curve is fixed at 100.

What is claimed is:

1. A luminescent screen provided with a luminescent silicate activated by bivalent europium, characterized in that the silicate is defined by the formula
Sr$_{1-x-y-z-p}$Ba$_x$Ca$_y$Mg$_z$Eu$_p$B$_2$Si$_2$O$_8$
in which
$0 \leq x \leq 0.60$
$0 \leq y \leq 0.50$
$0 \leq z \leq 0.25$
$0.01 \leq p \leq 0.20$
$x + y + z + p \leq 0.70$.

2. A luminescent screen as claimed in claim 1, characterized in that
$0.10 \leq x \leq 0.40$.

3. A luminescent screen as claimed in claim 2, characterized in that
$0.05 \leq z \leq 0.15$.

4. A luminescent screen as claimed in claim 3, characterized in that $0.03 \leq p \leq 0.10$.

5. A low-pressure mercury vapour discharge lamp provided with a luminescent screen as claimed in claim 1.

6. A high-pressure mercury vapour discharge lamp provided with a luminescent screen as claimed in claim 1.

7. A luminescent silicate activated by bivalent europium defined by the formula Sr$_{1-x-y-z-p}$Ba$_x$Ca$_y$Mg$_z$Eu$_p$B$_2$Si$_2$O$_8$,
in which
$0 \leq x \leq 0.60$
$0 \leq y \leq 0.50$
$0 \leq z \leq 0.25$
$0.01 \leq p \leq 0.20$
$x + y + z + p \leq 0.70$

* * * * *

UNITED STATES PATENT OFFICE
CERTIFICATE OF CORRECTION

Patent No. 3,813,569 (PHN 6058)   Dated   May 28, 1974

Inventor(s) JUDICUS MARINUS PIETER JAN VERSTEGEN ET AL

It is certified that error appears in the above-identified patent and that said Letters Patent are hereby corrected as shown below:

Column 6, line 38, change "$Z^{o}p$" to -- $Z+p$ --.

Signed and sealed this        day of              1974.

Signed and sealed this 1st day of October 1974.

(SEAL)
Attest:

McCOY M. GIBSON JR.
Attesting Officer

C. MARSHALL DANN
Commissioner of Paten